June 19, 1951  E. F. WOODLAND  2,557,211
CABINET LID
Filed June 30, 1947
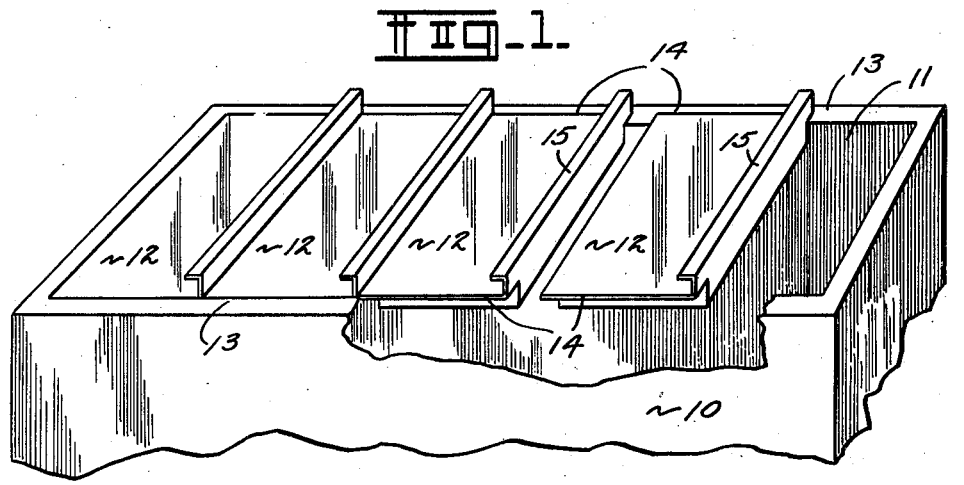
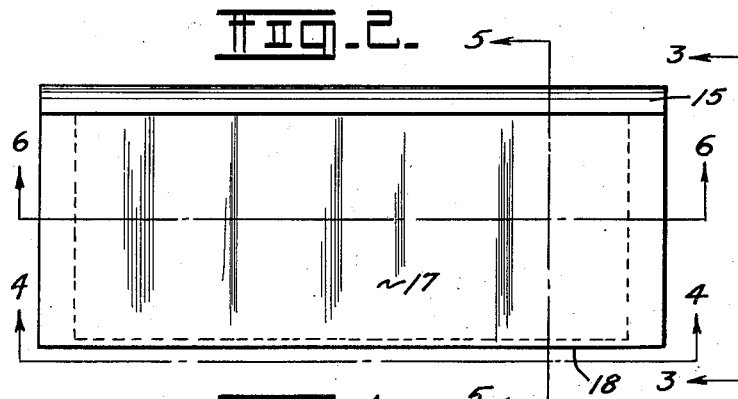
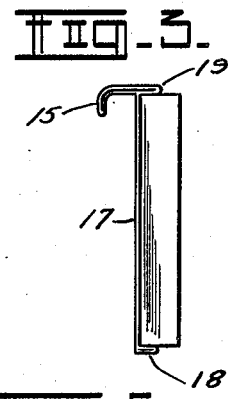
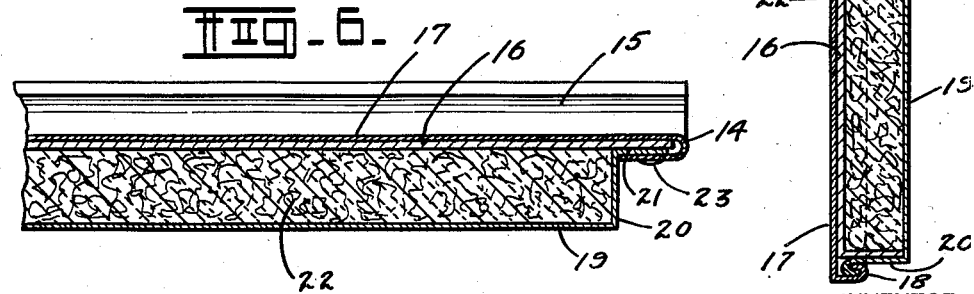
INVENTOR.
Edward F. Woodland.
BY
ATTORNEY.

Patented June 19, 1951

2,557,211

UNITED STATES PATENT OFFICE 2,557,211

CABINET LID

Edward F. Woodland, Youngstown, Ohio

Application June 30, 1947, Serial No. 758,026

2 Claims. (Cl. 220—41)

This invention relates to a lid and more particularly to a lid for an ice cream cabinet, frozen food cabinet or the like wherein a plurality of identically formed lids are slidably positioned on a cabinet so as to form closures for the majority of the open, uppermost portion of the cabinet.

The principal object of the invention is the provision of a cabinet lid of novel, lightweight, rigid construction.

A further object of the invention is the provision of a cabinet lid formed with a minimum of seams so as to provide an unbroken surface area for preventing the entrance of moisture into the interior of the lid.

A still further object of the invention is the provision of a cabinet lid comprising a lightweight, thin, appropriately shaped, metal envelope having means disposed therein lending rigidity to the said metal envelope and means providing a high degree of insulation with respect to the upper and lower surfaces of the cabinet lid.

A still further object of the invention is the provision of a cabinet lid which is capable of positioning across an open top cabinet and maintaining itself in horizontal non-sagging relation with respect thereto and at the same time being relatively light in weight and capable of being readily moved along the cabinet so as to provide convenient access thereinto.

A still further object of the invention is the provision of a cabinet lid having an integrally formed, upwardly extending handle member providing means for moving the lid and lending rigidity to the construction thereof.

The cabinet lid shown and described herein is particularly adapted for use in connection with ice-cream cabinets, frozen food cabinets and the like wherein relatively low temperatures are constantly maintained and wherein convenient access into the said cabinets is desirable. It is known that many and various forms of refrigerated cabinet constructions have been devised for holding various refrigerated foods and the like and that these are commonly formed with their access opening in the top thereof and that various forms of lids or closures have been proposed for controlling the entrance of warm air into the refrigerated cabinet. These lids and closures have in the past frequently comprised heavy, bulky objects which did not form satisfactory closures, were difficult in moving and conducted heat readily so as to result in condensation of moisture on their upper surfaces, all of which is objectionable and unsatisfactory.

The present invention relates to a cabinet lid which overcomes the objections hereinbefore mentioned in that it is of relatively light weight construction, has a continuous unbroken surface, is rigid and capable of maintaining itself in desired position and is insulated to avoid condensation on its exposed surfaces. Further, it is provided with a handle member extending completely along one edge of one side of the lid so that it can be readily grasped and moved and the construction of the handle member contributes to the rigidity of the device. A plurality of the cabinet lids, as disclosed herein, form efficient and entirely satisfactory, movable closures for a refrigerated cabinet.

With the foregoing and other objects in view which will appear as the description proceeds the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a perspective view of a portion of a refrigerated cabinet showing a plurality of cabinet lids in position thereon.

Figure 2 is a top plan view of a cabinet lid.

Figure 3 is an end elevation of the cabinet lid taken on line 3—3 of Figure 2.

Figure 4 is a side elevation of the cabinet lid taken on line 4—4 of Figure 2.

Figure 5 is an enlarged cross section taken on line 5—5 of Figure 2.

Figure 6 is an enlarged cross section taken on line 6—6 of Figure 2.

By referring to the drawings and Figure 1 in particular it will be seen that a refrigerator cabinet 10 having an opening 11 in its top portion has been shown and a plurality of lids 12 are shown in position thereon. Each of the lids 12 is positioned transversely of the opening 11 in the cabinet 10 and rests upon slides 13 forming the uppermost surfaces of the cabinet 10. Each of the cabinet lids 12 has outwardly extending end sections 14 which overlie the slides 13 and thereby support the lids 12 thereon. The outwardly extending end sections 14 are relatively thin as compared with the thickness of the body portion of the lids 12 as the same depends, in effect, therefrom, being of a length equal to the width of the opening 11 in the cabinet 10 so as to form a satisfactory closure therefor when the plurality of lids 12 are in edge-to-edge engagement and a sufficient number of lids 12 are employed to completely fill the opening 11.

Each of the lids 12 is provided with an upstanding and inturned, transversely extending handle 15 formed as an integral part of the lid construction and is of the same length as the lid, including the extending end sections 14, and thereby overlies the slides 13 and each end of the lid construction. The lids 12 are each formed of a desirable, thin, metal envelope (such as stainless steel) folded to form an enclosure with a minimum of seams and folded about a channel 16 which lends rigidity to the structure.

By referring to Figures 5 and 6 of the drawings the disposition of the channel 16 in the lid may be seen, it being observed that the channel 16 is relatively wide and that the flat body portion thereof underlies the top portion of the lid 12 and the downturned side portions thereof underlie the side portions of the lid 12 and the end portions thereof extend out into the extensions 14 of the lid 12 so that the channel 16 is directly carried on the slides 13 of the cabinet. The corners of the channel 16 are cut away to permit the downturned portions thereof to conform in overall length to the main body portion of the lid while the flat top surfaces of the channel 16 extend out into the extensions 14.

In forming the envelope of thin metal (preferably stainless steel) about the channel 16, the upper portion of the lid is formed of a section of thin sheet material 17 bent into a depending, U-shaped, double fold 18 along the edge of the lid 12 opposite the handle 15 from which it continues across the top of the lid to form the uppermost surface lying directly on the upper surface of the channel 16 and being upturned and inturned to form the handle 15 and then backturned upon itself and downturned to form the outer depending edge 15, the lowermost portion of which is formed in a U shape 19. The end portions of the section of sheet material 17 are inturned upon themselves, as best shown in Figure 6 of the drawings, and form the extensions 14 and are formed about the extending end sections of the channel 16.

The depending body portion of the lid is formed of a section of thin sheet material 19, the corners of which are cut away to permit the respective side portions 20 to be formed. The corner portions are spot welded to lend rigidity to the device. The side portions 20 are bent outwardly on the ends to form extensions 21 comparable with the extensions of the channel 16 which they immediately underlie, as the surface sheet 17 heretofore referred to (as best shown in Figure 6) forming the end extensions 14 envelopes both the extensions of the channel 16 and the extensions 21 of the sides 20 of the bottom section 19. The longitudinal side seams 18 heretofore referred to interengage downturned edges of the sides 20 of the sheet 19, as best shown in Figure 5 of the drawings.

It will thus be seen that the only seams resulting from the formation of the thin metal envelope are the four corner seams in the sheet 19 and spacing the four edge walls 20 thereof and which corners are welded and are then soldered. The two longitudinal seams 18 are double folded for security and are preferably soldered to seal the same and the end seams completely underlie the extensions 14 and are soldered to seal the same. Insulation such as spun glass or rock wool, indicated by the numeral 22, is disposed within the area of the channel 16 as defined by the bottom sheet 19 so that heat conduction is controlled to the end that the upper surface 17 of the lid 12 is effectively insulated from the lower surface which is exposed to the cold interior of the refrigerator cabinet 10.

It will be seen that a light, thin, metal envelope has been disclosed which completely surrounds and envelopes the channel 16 of heavier material such as steel and that suitable space is provided by the construction for the insulating material 22 and that all of the seams are mechanically sound and sealed against water vapor or water leakage by solder or the like. In order that the lids may have a long and satisfactory life, spots of solder 23 or other soft metal are preferably added at the corners of the extensions 14 to form bearing surfaces on which the lids normally slide.

It will thus be seen that a simple and unusually efficient lid for a refrigerated cabinet has been disclosed which has the unique advantages of being light in weight, moisture proof, has no exposed seams, and is so formed as to preclude the admission of water vapor or water in liquid form into the interior thereof. The continuous handle 15 formed longitudinally of the lid lends rigidity to the surface sheet 17 and serves to insure its relative positioning to the channel 16 over which it is positioned thereby forming a completely satisfactory, strong, durable lid of high insulating value and of light weight.

Having thus described my invention, what I claim is:

1. A lid for a refrigerated cabinet and comprising a thin metal envelope formed directly over a channel member and supported thereby, the said channel member including a flat body portion having downturned side portions and end portions extending beyond the ends of the said side portions, end sections on the thin metal envelope enclosing the said end portions of the said channel, insulating material in the area enclosed by the said thin metal envelope and the channel and at least one edge of the said thin metal envelope being doubled and upturned and inturned for the dual purpose of lending rigidity to the structure and providing a handle by which the lid may be moved.

2. A lid for a refrigerated cabinet and comprising a body member having upturned side walls and upturned end sections having outturned flanges, the upper edges of the said side walls being downturned, an inverted channel comprising a flat body member having downturned flanges and extended end sections positioned in the said body member, a filling of insulating material, a top surface sheet positioned on the said inverted channel, the edges of the top surface sheet being downturned and doubled back upon themselves to engage the downturned edges of the side walls, the said end sections of the said channel extending beyond the said body member to form extensions for carrying the said lid.

EDWARD F. WOODLAND.

REFERENCES CITED

The following references are of record in the file of this patent:

UNITED STATES PATENTS

| Number | Name | Date |
|---|---|---|
| 82,766 | Stone | Oct. 6, 1868 |
| 1,268,707 | Gehnrich | June 4, 1918 |
| 1,696,456 | Sebring | Dec. 25, 1928 |
| 2,087,641 | Ellis | July 20, 1937 |
| 2,160,436 | Jones | May 30, 1939 |
| 2,178,254 | Fader | Oct. 31, 1939 |
| 2,202,476 | Baker | May 28, 1940 |
| 2,231,216 | Nystrom | Feb. 11, 1941 |